UNITED STATES PATENT OFFICE.

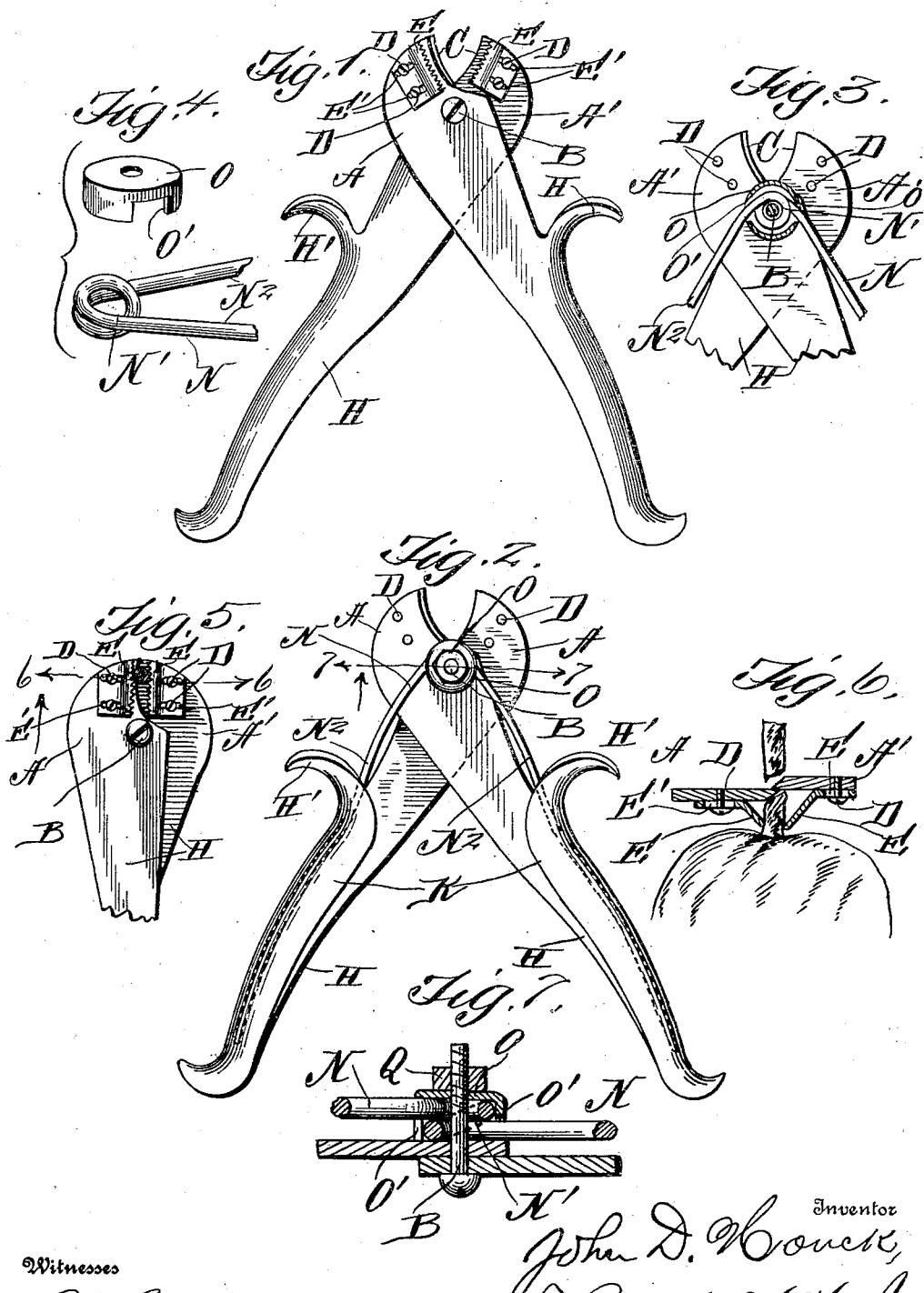

JOHN D. HOUCK, OF TOLEDO, OHIO.

FRUIT-PICKER.

No. 921,402.　　　　Specification of Letters Patent.　　　　Patented May 11, 1909.

Application filed August 17, 1908. Serial No. 448,841.

*To all whom it may concern:*

Be it known that I, JOHN D. HOUCK, a citizen of the United States, residing at Toledo, in the county of Lucas and State of Ohio, have invented certain new and useful Improvements in Fruit-Pickers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fruit picking devices, and comprises two blades which are pivoted together and provided each with a concaved cutting edge adapted to have a shearing contact, each blade carrying an adjustable fruit clamping jaw adapted to form means for holding the stem after the latter has been severed, the shank portions of the blades being provided with guards, whereby the hand of the operator may be securely held from contact with the blade.

More specifically, the invention comprises two complemental blades which are pivoted together and each provided with a handle, a spring being wound about the pivotal point, and in the provision of a hollow recessed cap fitted over the coil of the spring and held securely in place by means of a jam nut, the arms of the spring passing through and held in the recesses of the cap and also by flanges upon the handles of the blades.

The invention comprises various details of construction and combinations and arrangements of parts which will be hereinafter fully described and then specifically defined in the appended claim.

I illustrate my invention in the accompanying drawings, in which:—

Figure 1 is a perspective view of my improved fruit cutting and holding device. Fig. 2 is a rear view of the device. Fig. 3 is a sectional view through the pivot and the hollow cap fitted thereover, showing parts of the invention in elevation. Fig. 4 are detail views showing the cap and the coiled spring held thereby. Fig. 5 is an elevation showing the jaws positioned in clamping relation to each other. Fig. 6 is a sectional view through the cutting blades and the holding jaws, and Fig. 7 is a sectional view on line 7—7 of Fig. 2.

Reference now being had to the details of the drawings by letter, A and A' designate two cutting blades, and B is a pivot on which said blades are mounted. Each of the blades has a concaved cutting edge C which shear together in the usual manner employed upon certain pruning instruments. Mounted upon each of said blades is an adjusting screw D, and E are jaws having serrated edges and each provided with a transverse slot E' through which the adjusting screw D passes, and operating means whereby said jaws may be held in different adjusted positions accordingly as it may be desired to utilize the tool in cutting and holding fruit having different sized stems. Each of said blades is provided with a handle portion designated by letter H, and H' is a guard projecting from each handle upon the outer edge thereof and affords means whereby the thumb and fingers of an operator grasping the handles may be held from sliding upon the blades, when an endwise pressure is applied to the instrument. Each of said handles is provided with a flange, designated by letter K, and shown clearly in Fig. 2 of the drawings, corresponding ends of said flanges forming the guards H' described.

A resilient wire designated by letter N is turned to form a coil N' which fits over the pivot B, and O is a hollow cap having recesses O' formed in the cylindrical wall thereof, said recesses being for the reception of the arms N of said wire, as shown clearly in Fig. 3 of the drawings. Each of said arms $N^2$ extends nearly the length of the flange K which holds the same, as shown in dotted lines in Fig. 2 of the drawings. The inner edge of the flange of the cap O is adapted to bear frictionally against the face of the blade A, and Q is a jam nut which is mounted upon the threaded end of the pivot B and is adapted to hold the cap O so that the blades will be clamped between the latter and the head B' of the pivot, as shown in Fig. 7 of the drawings.

The operation of my fruit cutting and holding instrument is as follows. The thumb and finger of the operator gripping the two handles may cause the two shearing edges of the blade to come together and sever the stem of the fruit and simultaneously with the cutting of the stem, the latter is gripped and held by the jaws E, the two blades being securely held in shearing relation by means of the cup and the jam nut bearing against the same, the arms of the spring serving to throw the cutting edges away from each other after the pressure of the hand thereon is released. By reason of the guards upon the handles, the hand of the operator is prevented from moving beyond said guards and allows the operator to exert a pushing movement to the instrument without the hand slipping.

What I claim is:—

A fruit cutting and holding instrument comprising two jaws pivoted together and provided with concaved cutting edges, adjustable serrated twig holding jaws mounted one upon each of said cutting jaws, the handle of each cutting jaw being turned into a roll, the ends of each roll formed into curved hooks adapted to bear against the opposite edges of the palm of a hand gripping the instrument, a spring coiled about the pivot of the jaws and extending substantially the length of the handles and each end of the spring bearing yieldingly against the inner surface of said rolled portion of the handle, a cup having diametrically opposite apertures in the flange thereof extending partially the width of the flange and adapted to receive the arms of said spring, as shown and described.

In testimony whereof I hereunto affix my signature in the presence of two witnesses.

JOHN D. HOUCK.

Witnesses:
A. L. HOUGH,
ROBERT A. BOSWELL.